(12) United States Patent
Laning et al.

(10) Patent No.: US 7,733,339 B2
(45) Date of Patent: Jun. 8, 2010

(54) SYSTEM AND METHOD FOR PARTITIONING CAD MODELS OF PARTS INTO SIMPLER SUB-PARTS FOR ANALYSIS OF PHYSICAL CHARACTERISTICS OF THE PARTS

(75) Inventors: Raymond C. Laning, Chesterland, OH (US); Steven J. Manson, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 110 days.

(21) Appl. No.: 12/115,009

(22) Filed: May 5, 2008

(65) Prior Publication Data

US 2008/0204454 A1 Aug. 28, 2008

Related U.S. Application Data

(63) Continuation-in-part of application No. 12/015,772, filed on Jan. 17, 2008, now abandoned, which is a continuation-in-part of application No. 10/838,411, filed on May 4, 2004, now Pat. No. 7,321,364.

(51) Int. Cl.
*G06T 17/00* (2006.01)
*G06F 19/00* (2006.01)
*G06F 17/50* (2006.01)

(52) U.S. Cl. .................... 345/420; 345/419; 700/98; 703/1

(58) Field of Classification Search .................. None
See application file for complete search history.

(56) References Cited

U.S. PATENT DOCUMENTS 4,736,306 A 4/1988 Christensen 5,537,519 A 7/1996 Vossler
5,553,009 A * 9/1996 Meshkat et al. ............... 716/20

(Continued)

FOREIGN PATENT DOCUMENTS

EP 0643355 A 3/1995

(Continued)

OTHER PUBLICATIONS

J Tabary, A Glière—Coupling photon Monte Carlo simulation and CAD Software. Application to X-ray nondestructive evaluation Proc. Monte Carlo 2000.*

(Continued)

*Primary Examiner*—Daniel F Hajnik
(74) *Attorney, Agent, or Firm*—Eric A. Gifford (57) ABSTRACT

A slicing tool works with a solid modeling system to partition the geometric representation of a three-dimensional part into a series of simpler sub-parts the union of which replicates the original part in a manner that introduces a minimal number of new surfaces in each sub-part and in total. This approach uses the existing analytic surfaces that define the part geometry to partition the part and selects a partition from a quality metric based on the number of trimmed surfaces of the part being partitioned and the candidate sub-parts. This approach greatly reduces the complexity of any downstream solid modeling applications that perform combinatorial surface operations on the geometric representation of the series of sub-parts to analyze physical characteristics such as radiation, mechanical, optical, thermal, structural or biological of the original part.

28 Claims, 9 Drawing Sheets

U.S. PATENT DOCUMENTS

| | | | |
|---|---|---|---|
| 5,946,479 A * | 8/1999 | Sakaguchi et al. | 716/20 |
| 6,223,092 B1 * | 4/2001 | Miyakawa et al. | 700/103 |
| 7,096,206 B2 | 8/2006 | Hitt | |
| 7,155,367 B1 * | 12/2006 | Shapiro et al. | 702/182 |

FOREIGN PATENT DOCUMENTS

| | | |
|---|---|---|
| WO | 2004104870 A | 12/2004 |

OTHER PUBLICATIONS

M. Yerry et al., Automatic three-dimensional mesh generation by the modified-octree technique, Int. J. for Numerical Methods in Engineering, vol. 20, (1984, pp. 1965-1990.

E. Eugene Hartquist, BCSG-1.0: A practical implementation of boundary to CSG conversion, Sibley School of Mechanical & Aerospace Engineering, Cornell Univ., Aug. 1994.

S. Ragothama, Consistent updated in dual representation systems, Computer Aided Design Elsevier Publishers, vol. 32, No. 8-9 Aug. 2000, pp. 463-477.

V. Shapiro et al., Separation for boundary to CSG Conversion, ACM Transaction on Graphics, vol. 12, No. 1, Jan. 1993, pp. 35-55.

S. Buchele et al, Binary space partition tree and constructive solid geometry representations for objects bounded by curved surfaces, CCCG-Homepage, Online 2001, pp. 1-6.

K. Poutrain et al., Dual brep-CSG collision detection for general polyhedra, IEE 2001, 9th Pacific Conf on Computer Graphics, Oct. 16, 2001, pp. 124-133.

V.Shapiro et al., Construction and optimization of CSG representations, Computer Aided Design, Jan./Feb. 23, 1991, No. 1, London, GB.

Anonymous, Tart 95 Manual—Chapters 1-4, Lawrence Livermore National Laboratory Homepage, Online 1996, pp. 1-79, XP002309801.

V. Shapiro, Maintenance of geometric representations through space decompositions, International Journal of Computational Geometry & Applications.

World Scientific Publishing Company, pp. 1-31, 1997.

Vadim Shapiro, Well-formed set representations of solids, 1997, International Journal of Computational Geometry and Applications.

Shapiro et al., "Construction and Optimization of CSG Representations," Computer Aided Deisgn, Elsevier Publishers, vol. 23, No. 1, Jan. 1, 1991, pp. 4-20.

* cited by examiner

SYSTEM AND METHOD FOR PARTITIONING CAD MODELS OF PARTS INTO SIMPLER SUB-PARTS FOR ANALYSIS OF PHYSICAL CHARACTERISTICS OF THE PARTS

CROSS-REFERENCE TO RELATED APPLICATIONS

This application claims benefit of priority under 35 U.S.C. 120 as a continuation-in-part of co-pending U.S. application Ser. No. 12/015,772 entitled "Automated Translation of Higher Order Complex Geometry From A CAD Model Into A Surface Based Combinatorial Geometry Format" filed Jan. 17, 2008, which is a continuation of U.S. application Ser. No. 10/838,411 entitled "Automated Translation of Higher Order Complex Geometry From A CAD Model Into A Surface Based Combinatorial Geometry Format" filed May 4, 2004 and issued Jan. 22, 2008 as U.S. Pat. No. 7,321,364, the entire contents of which are incorporated by reference.

BACKGROUND OF THE INVENTION

1. Field of the Invention

This invention relates to the partitioning of three-dimensional parts such as mechanical, optical or biological parts into simpler representations to support downstream solid modeling applications that perform combinatorial surface operations on the geometric representations of the series of sub-parts to analyze physical characteristics such as radiation, mechanical, optical, thermal, structural or biological of the original part.

2. Description of the Related Art

Many modern computer-aided processes must subdivide space in and surrounding a solid geometry of a part of interest such as a mechanical, optical or biological part to perform their computations. Such subdivision is a necessary cost of doing business, but can become computationally prohibitively expensive when the geometry becomes even moderately complex. One example of this is radiation transport computation. To model what happens when radiation impinges on a part, the transport application must consider both bounding surfaces (how many particles pass through the surface) and the regions contained by the surfaces (how many particles are absorbed or cause secondary emission of radiation). Traditional simple-minded meshing partitioning would introduce far too many new (unnecessary) surfaces and volumes. Because computational time is a function of the combinations of surfaces, the resulting increase goes as the number of trimmed surfaces, factorial—even a small increase can double or triple the time required. Larger increases rapidly make computation impossibly slow.

Existing partitioning schemes include octrees (see Yerry, Mark A. and Mark S. Shephard "Automatic Three-Dimensional Mesh Generation By The Modified Octree Technique", *International Journal For Numerical Methods in Engineering*, John Wiley, Num 20, pp. 1965-1990, 1984), bounding boxes and bounding polyhedra. The latter two are often referred to as meshing. Octrees are used recursively, utilizing three perpendicular slice planes along the X, Y and Z planes, respectively, that rotely bisect a bounding box around the part to partition a space into eight regions of equal volume. This approach is simple but generally introduces twenty-four new surfaces for each application of partitioning, which runs counter to the stated goal of not introducing complexity. Bounding boxes are also simple and can use geometric information from the object, but are only good for partitioning rectangular regions. Curved or non-boxlike regions will not become simpler under this partitioning scheme. Bounding polyhedra can also be applied similarly, but unless the region to be partitioned contains geometry congruent to the polyhedra, offers no advantage when trying to simplify.

SUMMARY OF THE INVENTION

The present invention provides a slicing tool for use with a solid modeling system that partitions the geometric representation of a three-dimensional part into a series of simpler sub-parts the union of which replicates the original part in a manner that introduces a minimal number of new surfaces in each sub-part and in total. This approach is designed to greatly reduce the complexity of any downstream solid, modeling applications that perform combinatorial surface operations on the geometric representation of the series of sub-parts to analyze physical characteristics such as radiation, mechanical, optical, thermal, structural or biological of the original part.

This is accomplished by providing trimmed surfaces that form a boundary representation of the three-dimensional part such as found in an IGES or STEP file of a CAD model. The trimmed surfaces are represented as analytic surfaces that ate trimmed by other analytic surfaces, curves and points. The solid-modeler loads the geometry and provides two specific outputs that are used by the tool. First the solid-modeler provides a list of existing analytic surfaces used to represent the part that are available as candidates for slicing the part geometry. This list contains the analytic bounding surfaces and any ambiguity surfaces. These surfaces may be planar or non-planar. Second, in response to a command to partition the part along a particular surface selected from this list the solid-modeler partitions the part geometry into two or more sub-parts including their respective lists of analytic bounding surfaces and returns the number of trimmed surfaces in each of the sub-parts. The slicing tool commands the solid-modeler to partition the part geometry along multiple candidate slicing surfaces from the list, computes a quality metric for each candidate partition based on the number of trimmed surfaces in the part and sub-parts, and selects a partition based on the metric that introduces a small number of new surfaces in each sub-part and in total. The slicing tool may search the list of candidate surfaces in order, randomly or in order of proximity to the center of part or sub-part. The process is repeated on each sub-part, recursively or iteratively, to further simplify the geometry until the benefits of further partitioning are insufficient.

The slicing tool suitably uses a number of different quality metrics and tests based on the number of trimmed surfaces in the part and the candidate partitions to ensure that the part geometry is only partitioned if doing so simplifies the geometric representation for performing combinatorial surface operations and to identify the best (or sufficiently good) partition. The factorial metric most closely represents the complexity of the combinatorial surface operations and could (in theory) be used for both purposes. However, simply computing the factorial metric for parts that include a large number of surfaces can be prohibitively expensive in terms of computer resources and time. Therefore simpler metrics that serve as a 'proxy' for the factorial are used. The factorial metric is dominated by the maximum number of trimmed surfaces in any one sub-part; hence the proxy metrics are selected so that they too are dominated by the maximum. One such metric is the sum of the squares of the number of trimmed surfaces in the candidate sub-parts. A higher power than two would further emphasize the maximum number. Another such metric is the ratio of the maximum number of trimmed surfaces in any one of the candidate sub-parts to the number of trimmed surfaces in the part itself. Either metric ears be used to perform the tasks of ensuring a minimum amount of simplification by satisfying a criteria function and selecting a partition that is good enough (to avoid an exhaustive search through all candidate slicing surfaces) by setting two different threshold values. Likewise either metric can be used to select the best partition from ail candidates e.g. the smallest sum of squares or smallest ratio. An exemplary embodiment uses the sum of squares metric to determine whether a partition satisfies the criteria function and the ratio metric to select either the best partition or a partition that is good enough to terminate the search. The criteria function also serves as one way to terminate the partitioning of a particular part.

The tool may also use one or more complexity metrics (e.g. the number of trimmed surfaces in the part or current sub-part) and tests to determine whether to terminate the partitioning. In one instance, prior to any partitioning of the part (subsequent sub-parts), the number of surfaces is compared to a threshold. This threshold is set at a level where further partitioning is unlikely to provide meaningful simplification. If the number of surfaces is less than the threshold, the tool moves on to the next sub-part in the current geometry, in another instance, if all of the candidate slicing surfaces selected from the list of existing trimmed surfaces fail to provide a partition that satisfies the criteria function, the number of surfaces is compared to another threshold. This threshold is set at a level where further partitioning is likely to provide meaningful simplification even if the slicing surface is not selected from the list of existing surfaces. If the number does not exceed the threshold, the tool keeps the geometry of the current sub-part and moves on to consider the next sub-part in the geometry. If the number of surfaces exceeds this threshold then a second plurality of candidate slicing surfaces are computed and the partitioning is repeated using these surfaces. To limit the number of additional surfaces, this second set of surfaces is suitably derived from the existing list of analytic bounding surfaces for the part or sub-part. For example, the existing surfaces may be translated to form the new surfaces.

In one embodiment, a solid-modeling system represents the geometry of the part internally and provides two outputs that are used by the tool. First the solid-modeler generates a list of existing analytic surfaces used to represent the part that are available for slicing the part geometry. This list contains the analytic bounding surfaces and ambiguity surfaces. These surfaces may be planar or non-planar. Second, in response to a command to partition the part along a particular surface selected from this list the solid-modeler generates two or more sub-parts including their respective lists of analytic bounding surfaces and returns the number of trimmed surfaces in each of the sub-parts. The tool commands the solid-modeler to partition the part geometry along multiple candidate slicing surfaces from the list and evaluates the returned candidate partitions to select a partition that introduces a small number of new surfaces in each sub-part and in total. The tool suitably computes a first quality metric based on the number of trimmed, surfaces to determine whether a partition satisfies the criteria function and, if so, computes a second quality metric to determine whether the partition is good enough to terminate the search of the partition space. If not, the tool selects another surface from the list and the process repeats. For a given part (sub-part) the process may repeat until the premature search criteria is satisfied, the best of all the partitions is selected or none of the partitions satisfy the criteria function. In the latter case, the tool may, if the part/sub-part is sufficiently complex, compute a second set of slicing surfaces from the existing surfaces (such as by translating the existing surfaces) and repeat the partitioning process. The process is repeated on each sub-part, recursively or iteratively, to further simplify the geometry until the benefits of further partitioning are insufficient. Once every sub-part has terminated the solid-modeler outputs the lists of trimmed surfaces in, for example, an IGES or STEP file.

In another embodiment, a CAD system generates a CAD model for an assembly including at least one three-dimensional part. The CAD model includes a list of trimmed surfaces for each part that form a boundary representation in space. The trimmed surfaces are represented as analytic surfaces that are trimmed by other analytic surfaces, curves and points. The list of trimmed surfaces for the CAD model is loaded into a solid-modeling system. The solid-modeling system represents the geometry of the part internally and provides two outputs that are used by the tool. First the solid-modeler generates a list of existing analytic surfaces used to represent the part that are available for slicing the part. This list contains the analytic bounding surfaces (untrimmed) and any ambiguity surfaces. These surfaces may be planar or non-planar. Second, in response to a command to partition the part geometry along a particular surface selected from this list the solid-modeler generates two or more sub-parts including their respective lists of analytic bounding surfaces and returns the number of trimmed surfaces in each of the sub-parts. The tool commands the solid-modeler to partition the part along multiple candidate slicing surfaces from the list and evaluates the returned candidate partitions to select a partition that introduces a small number of new surfaces in each sub-part and in total. The tool suitably computes a first quality metric based on the number of trimmed surfaces to determine whether a partition satisfies the criteria function and, if so, computes a second quality metric to determine whether the partition is good enough to terminate the search of the partition space. If not, the tool selects another surface from the list and the process repeats. For a given part (sub-part) the process may repeat until the premature search criteria, is satisfied, the best of all the partitions is selected or none of the partitions satisfy the criteria function. In the latter case, the tool may, if the part/sub-part is sufficiently complex, compute a second set of slicing surfaces from the existing surfaces (such as by translating the existing surfaces) and repeat the partitioning process. The process is repeated on each sub-part, recursively or iteratively, to further simplify the geometry until the benefits of further partitioning are insufficient. Once every sub-part has terminated the solid-modeler outputs the lists of trimmed surfaces in, for example, an IGES or STEP file. A downstream application program in conjunction with a solid-modeling system performs combinatorial surface operations on the series of sub-parts to analyze physical characteristics such as radiation, mechanical, optical, thermal, structural or biological of the original solid. Some applications do not accept and IGES or STEP file format, in which case a translation program translates the sub-part representation into the specified input geometry, e.g. surface-based combinatorial geometry.

These and other features and advantages of the invention will be apparent, to those skilled in the art from the following detailed description of preferred embodiments, taken together with the accompanying drawings, in which:

DETAILED DESCRIPTION OF THE INVENTION

The present invention provides a slicing tool for use with a solid modeling system that partitions the geometric representation of a three-dimensional part into a series of simpler sub-parts the union of which replicates the original part in a manner that introduces a minimal number of new surfaces in each sub-part and in total. This approach is designed to greatly reduce the complexity of any downstream solid modeling applications that perform combinatorial surface operations on the geometric representation of the series of sub-parts to analyze physical characteristics such as radiation, mechanical, optical, thermal, structural or biological of the original part.

The slicing tool achieves optimality by being informed by geometric data already contained in the part geometry. In other words, the tool uses existing bounding surfaces to slice the part and selects the best slice (or one that is good enough to terminate the search). By using this approach, one can do the necessary computation on smaller and smaller regions of the geometry without introducing any more complexity (boundaries) to the model than it already contains—a divide and conquer approach that works well in this case. Another unique aspect of this approach is the ability to use different types of boundaries to do the subdivision. The boundaries are obtained from the geometry definition, so planes, cylinders, cones, spheres, and toroids are ail usable as dividing surfaces.

Figure 1:
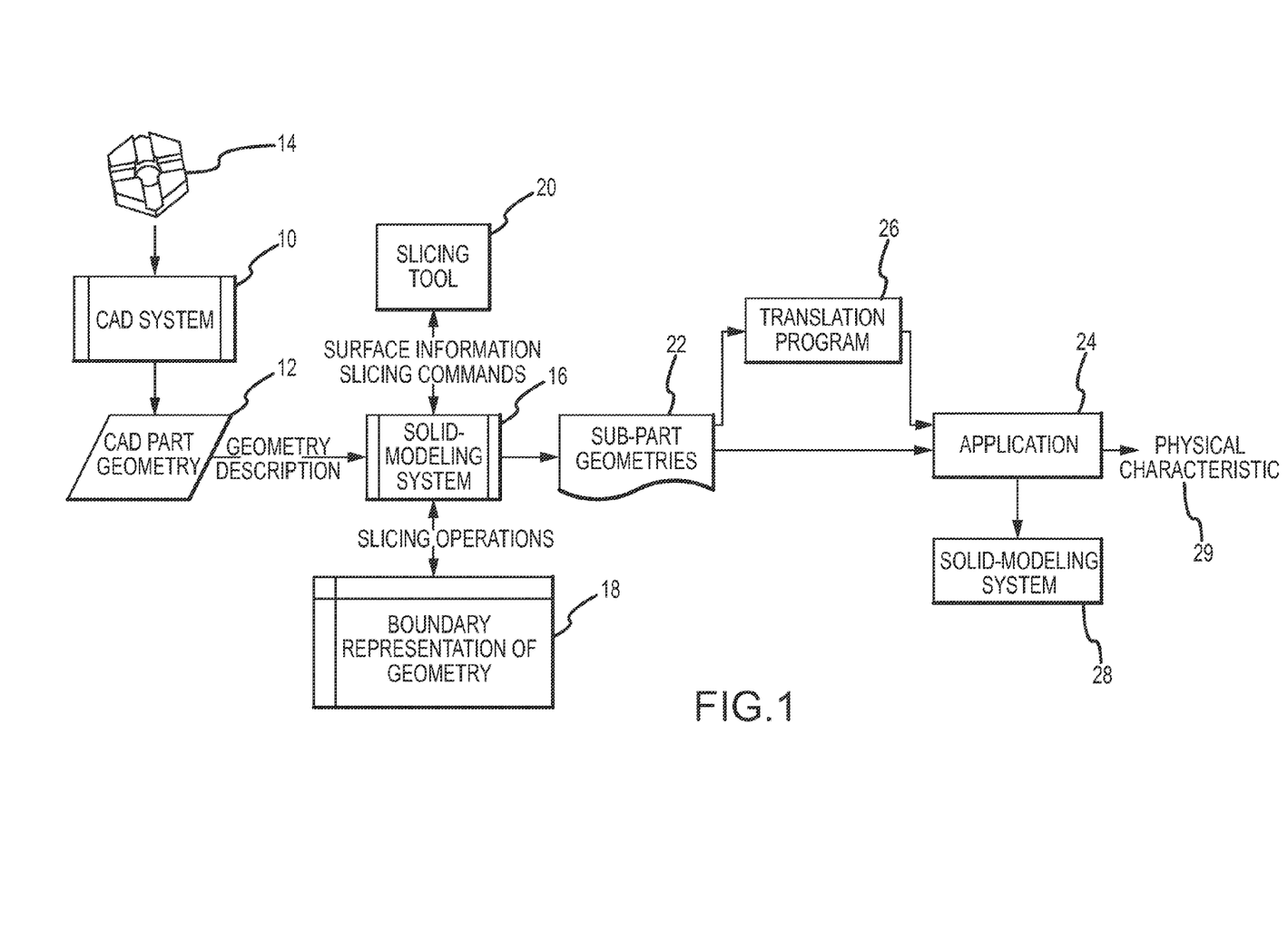
FIG. 1 is a block diagram of a system from end-to-end for generating a CAD model representation of a part, partitioning the representation into a series of sub-parts and performing combinatorial surface operations on the part using the sub-part representations to analyze a physical characteristic of the part.

As shown in FIG. 1, a CAD system 10 outputs a file 12 that provides a geometric description of one or more parts 14 e.g. a castlenut. These parts may be wholly generated by the CAD system or scanned in such as in medical imaging and configured into the file format. The geometric model is a boundary representation of a part that can have a simple Boolean operation performed on it, that of slicing with a surface that extends to or beyond the existing boundaries of the part. The result is then two or more parts that may also have the Boolean operation performed on them, also with valid results. For input file format, we used both STEP and IGES, which are commonly used standard geometry languages that can describe surface boundaries, solids and Boolean operations on the solids. For each part, the file includes a list of analytic bounding surfaces that are trimmed by other analytic bounding surfaces, curves and points to define the geometric representation of the part. The file also includes instructions for combining the surfaces into the part. These parts can be oriented by translation or rotation in space. This representation is capable of modeling a wide range of objects—for example, from airplanes to the human body. These standard files can be output from models in any CAD system. Other file formats than STEP or IGES that generate the list of analytic bounding surfaces that define the part geometry may be used.

The standard geometry for the part in input file 12 is loaded into a computer-implemented solid modeling system 16 and stored in an internal boundary representation 18. A computer implemented slicing tool 20 interacts with the solid modeler to perform slicing operations that partition the part geometry to produce a series of simpler sub-part geometries the union of which is the original part geometry. These sub-part geometries are suitably output in a file 22 in the same STEP or IGES file format. The slicing tool and solid modeler could be implemented inside the CAD system and receive the geometry in a proprietary internal format, one that provides the requisite list of analytic bounding surfaces. The slicing tool achieves optimality by being informed by the solid modeler of geometric data already contained in the part geometry. Optimality is defined as partitioning the part into simpler sub-parts while minimizing the total number of trimmed surfaces and minimizing the maximum number of trimmed surfaces in any one sub-part. In general, the slicing tool picks an existing surface that best partitions the part into two or more sub-parts and repeats the process on each sub-part, recursively or iteratively, to further simplify the geometry until the benefits of further partitioning are insufficient.

The simpler sub-part geometries are then input to a computer-implemented application 24 either directly in the STEP or IGES file format or via a computer-implemented translation program 26 that translates the file format into a format such as a surface based combinatorial geometry (SBCG) format used by the application. An exemplary translation program is described in U.S. Pat. No. 7,321,364. Application 24 interacts with a solid-modeling system 28 to perform combinatorial surface operations on the analytic bounding surfaces for each of the sub-part geometries to analyze physical characteristics such as radiation, mechanical, optical, thermal, structural or biological of the original part and generate outputs 29 of those physical characteristics. Applications may include radiation transport analysis, collision detection, interference checking, and 3d meshing to name a few. Ray-tracing is one means of performing combinatorial surface operations. The computational burden of performing combinatorial surfaces operations is approximately the number of trimmed surfaces in each sub-part geometry factorial summed over all of the sub-parts. The nature of the factorial operator is such that the maximum number of trimmed surfaces in any sub-part geometry will dominate. Typical parts can have hundreds of trimmed surfaces that define their geometry. Accordingly, it is very important that the partitioning process of creating the simpler sub-parts to simplify the analysis does not significantly add to the total number of surfaces and should endeavor to reduce the maximum number of surfaces for any sub-part.

Figure 2:
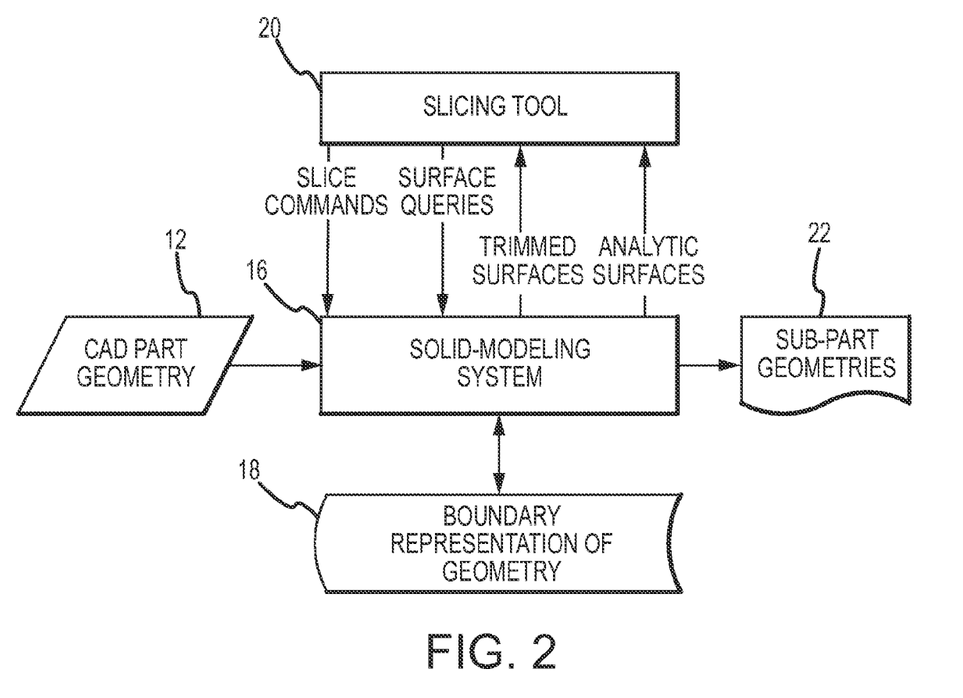
FIG. 2 is a block diagram of the I/O between the slicing tool and solid-modeling system.
Figure 3A:
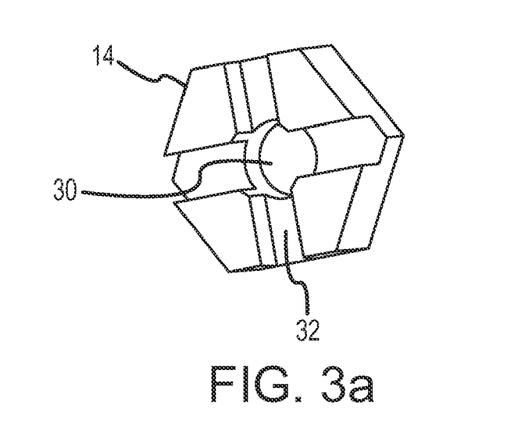
FIGS. 3a through 3c are diagrams of a castlenut part, the existing analytic bounding and ambiguity surfaces and the selecting slicing surface.
Figure 3B:
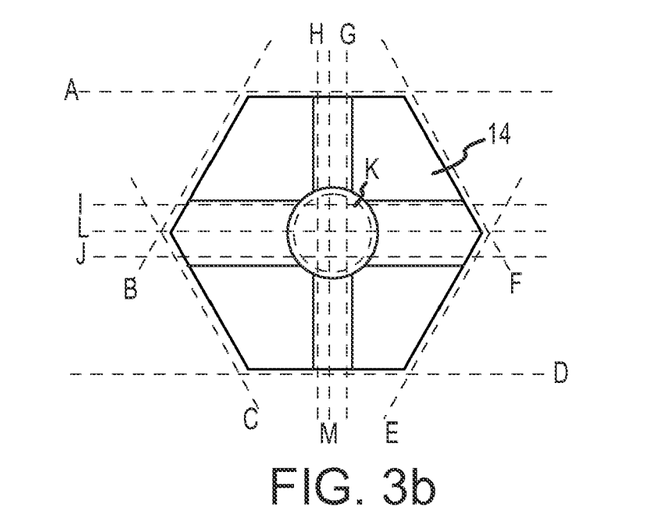
Figure 3C:
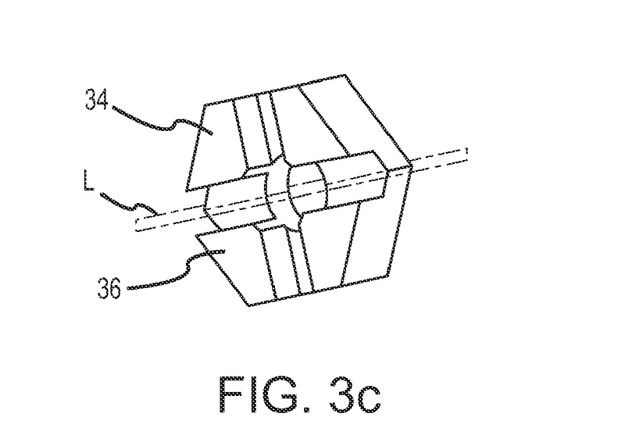

As shown in FIG. 2, the slicing tool 20 and solid modeler 16 interact with a few simple commands and standard outputs available from commercially available solid modelers. In response to a first surface query from the slicing tool the solid-modeler provides the list of existing analytic surfaces used to represent the part as candidate slicing surfaces. This list contains the analytic bounding surfaces and any ambiguity surfaces. These surfaces may be planar or non-planar. In response to a slice command from the slicing tool to partition the part along a particular surface selected from this list, the solid-modeler partitions the part geometry into two or more sub-parts including their respective lists of analytic bounding surfaces. In response to another surface query from the slicing tool, the solid modeler provides the number of trimmed surfaces in each of the sub-parts. Using these basic queries and commands and the outputs provided by the solid modeler, the slicing tool commands the solid-modeler to partition the part geometry along multiple candidate slicing surfaces from the list, computes a quality metric for each candidate partition based on the number of trimmed surfaces in the part and sub-parts, and selects a partition based on the metric that introduces a small number of new surfaces in each sub-part and in total. The slicing tool may search the list of candidate surfaces in order, randomly or in order of proximity to the center of part or sub-part. The process is repeated on each sub-part, recursively or iteratively, to further simplify the geometry until the benefits of further partitioning are insufficient. At each repetition, the selected sub-parts from the previous step become the current parts, which are petitioned into two or more sub-parts. As such, the lists of analytic surfaces associated with each sub-part only define that sub-part and get shorter and shorter as the process repeats breaking them into more but simpler sub-parts. Once partitioning of the part is complete, the modeler writes the lists of analytic bounding surfaces for each sub-part out to file 22.

A couple partitioning iterations on the simple castlenut part 14 are depicted in FIGS. 3a-c and 4a-4c. The whole castlenut has twenty-four trimmed surfaces. The modeler creates ambiguity surfaces to represent void spaces in parts such as the through-hole 30 through and crossing channels 32 in the castle nut. A number of the analytic bounding and ambiguity surfaces are shown in the plan view of FIG. 3b including planar bounding surfaces A through J and cylindrical bounding surface K and ambiguity surfaces L and M. For clarity, the analytic surfaces (dashed) are slightly offset from the trimmed surfaces they create (solid) as facets of the part. In response to a surface query the modeler provides this list of existing surfaces to the slicing tool. In this example, the tool considers the partitions based on different slicing surfaces and selects bounding surface L to slice the part. This is a plane already present in the definition of the nut, and because it resulted in sub-parts 34 and 36 having the smallest total number of trimmed surfaces (16 and 16) and the smallest maximum number (16) of trimmed surfaces, it won out over all the other bounding surfaces that were candidate slice surfaces.

Figure 4A:
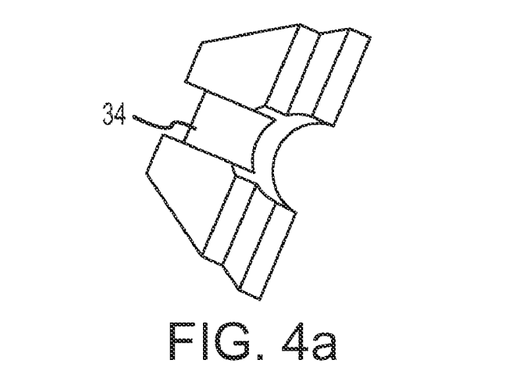
FIGS. 4a through 4c are diagrams of a first sub-solid of castlenut part, the existing analytic bounding and ambiguity surfaces for the sub-solid and the selecting slicing surface.
Figure 4B:
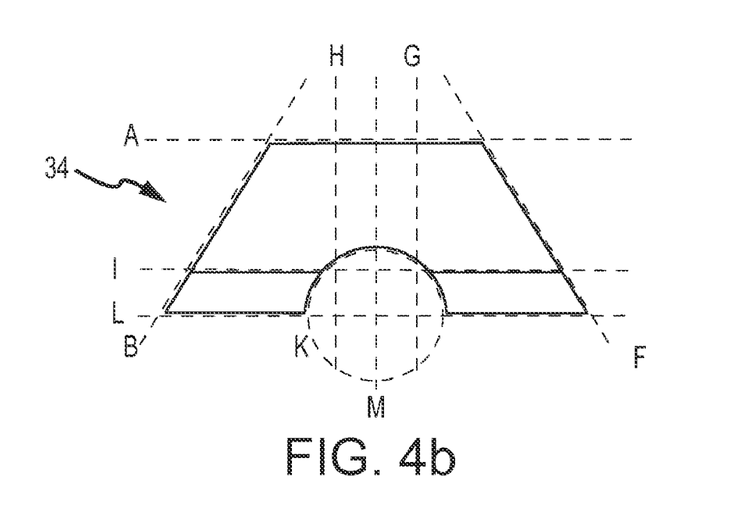
Figure 4C:
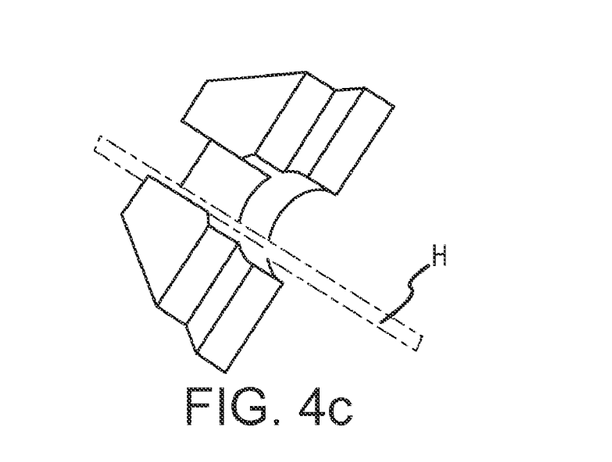

The slicing tool then operates on each of these sub-parts of which sub-part 34 is shown in FIG. 4a. Typically, the modeler will generate the list of existing analytic surfaces for each part on which it operates. Alternately, the modeler could save the lists of analytic surfaces for the sub-parts from the selected partition. The result is equivalent. In response to a surface query, the modeler provides the list of existing surfaces to the tool. In this case, the modeler provides a list of sixteen surfaces including A, B, F, G, H, I, K, L and M as shown in FIG. 4b. The new lists for each sub-part will inherently include new surfaces in addition to a subset of those that define the geometry of the bigger part. These new surfaces constitute existing surfaces of the sub-part for the next partitioning step. In this simple example, none of the new surfaces are shown. The slicing tool is designed in the way it selects the partition to limit the number of these new surfaces at each iteration. At this iteration, the tool selects surface H to slice the part. As the geometry is further partitioned, the new surfaces that define the sub-part are then considered for further subdivision of that part. The tool continues to partition each part until a termination criteria is met. At this point the modeler writes the list of surfaces for each sub-part out to the file.

The slicing tool suitably uses a number of different quality metrics and tests based on the number of trimmed surfaces in the part and the candidate partitions to ensure that the part geometry is only partitioned if doing so simplifies the geometric representation for performing combinatorial surface operations and to identify the best (or sufficiently good) partition. The factorial metric (sum $X_i$!) where X is the number of trimmed surfaces in the $i^{th}$ sub-part) most closely represents the complexity of the combinatorial surface operations and could (in theory) be used for both purposes. However, simply computing the factorial metric for part s that include a large number of surfaces can be prohibitively expensive in terms of computer resources and time. Therefore simpler metrics that serve as a 'proxy' for the factorial are used. The factorial metric is dominated by the maximum number of trimmed surfaces $X_i$ in any one sub-part; hence the proxy metrics are selected so that they too are dominated by the maximum. One such metric is the sum of the squares of the number of trimmed surfaces in the candidate sub-parts. A higher power than two would further emphasize the maximum number. Another such metric is the ratio of the maximum number of trimmed surfaces in any one of the candidate sub-parts to the number of trimmed surfaces in the part itself.

Either metric can be used to perform the tasks of ensuring at least a minimum amount of simplification by satisfying a criteria function and selecting a partition that is good enough (to avoid an exhaustive search through all candidate slicing surfaces) by setting two different threshold values. Likewise either metric can be used to select the best partition from all candidates e.g. the smallest sum of squares or smallest ratio. For example, if a geometry of 100 boundary surfaces results in two regions of 95 and 12 surfaces, that is not considered a worthwhile slice. A slice resulting in two regions of 65 and 55 surfaces, on the other hand, is considered an excellent choice and would receive a high (passing) grade from the criteria function. The reason that the (65,55) slice is better than the (95,12) is because, although the total number of surfaces of the (95,12) slice, 107 is less than that of the (65, 55) slice, 120 is because of the behavior of the factorial function. 95 factorial is a much larger number than the sum of 65 factorial and 55 factorial and the criteria function uses that consideration when establishing a threshold for worthwhile candidate surfaces. An exemplary embodiment uses the sum of squares metric to determine whether a partition satisfies the criteria function and the ratio metric to select either the best partition or a partition that is good enough to terminate the search. The criteria function also serves as one way to terminate the partitioning of a particular part.

Figure 5:
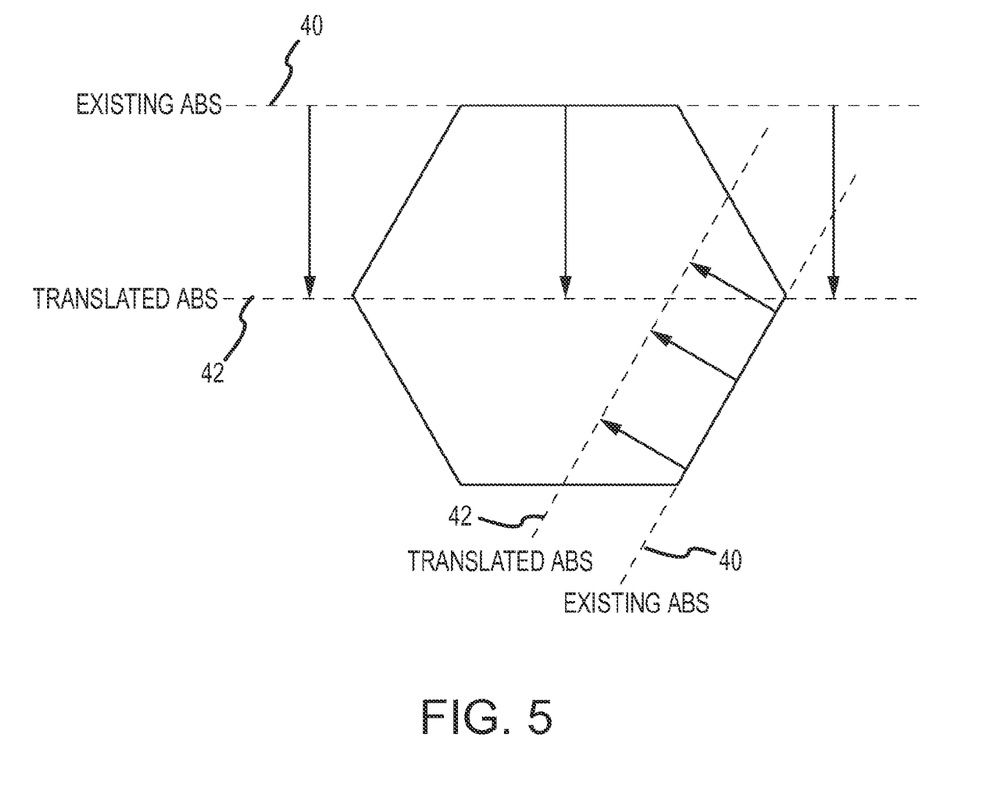
FIG. 5 is a diagram illustrating the generation of a second set of candidate slices derived from the existing surfaces.

The tool may also use one or more complexity metrics (e.g. the number of trimmed surfaces in the part or current sub-part) and tests to determine whether to terminate the partitioning. In one instance, prior to any partitioning of the part (subsequent sub-parts), the number of surfaces is compared to a threshold. This threshold is set at a level where further partitioning is unlikely to provide meaningful simplification. If the number of surfaces is less than the threshold, the tool moves on to the next sub-part in the current geometry. In another instance, if all of the candidate slicing surfaces selected from the list of existing trimmed surfaces fail to provide a partition that satisfies the criteria function, the number of surfaces is compared to another threshold. This threshold is set at a level where further partitioning is likely to provide meaningful simplification even if the slicing surface is not selected from the list of existing surfaces. If the number does not exceed the threshold, the tool keeps the geometry of the current sub-part and moves on to consider the next sub-part in the geometry. If the number of surfaces exceeds this threshold then a second plurality of candidate slicing surfaces are computed and the partitioning is repeated using these surfaces. To limit the number of additional surfaces, this second set of surfaces is suitably derived from the existing list of analytic bounding surfaces for the part or sub-part. For example, the existing analytic bounding surfaces (ABS) 40 may be translated to form the new surfaces 42 that may provide good partitions as shown in FIG. 5.

Figure 6A:
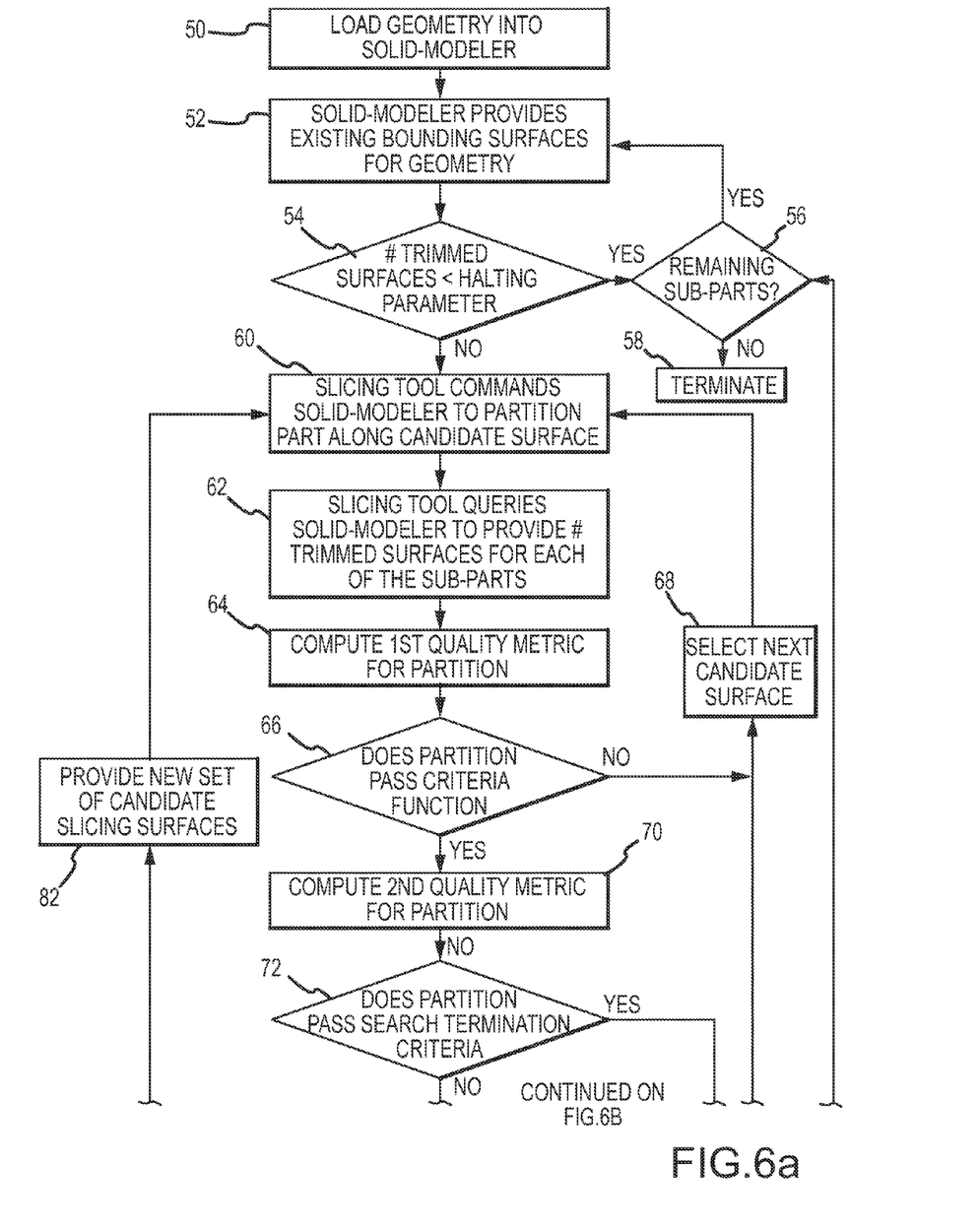
FIGS. 6a and 6b are a flow diagram of an exemplary embodiment of the partitioning process executed by the solid-modeling system and slicing tool.
Figure 6B:
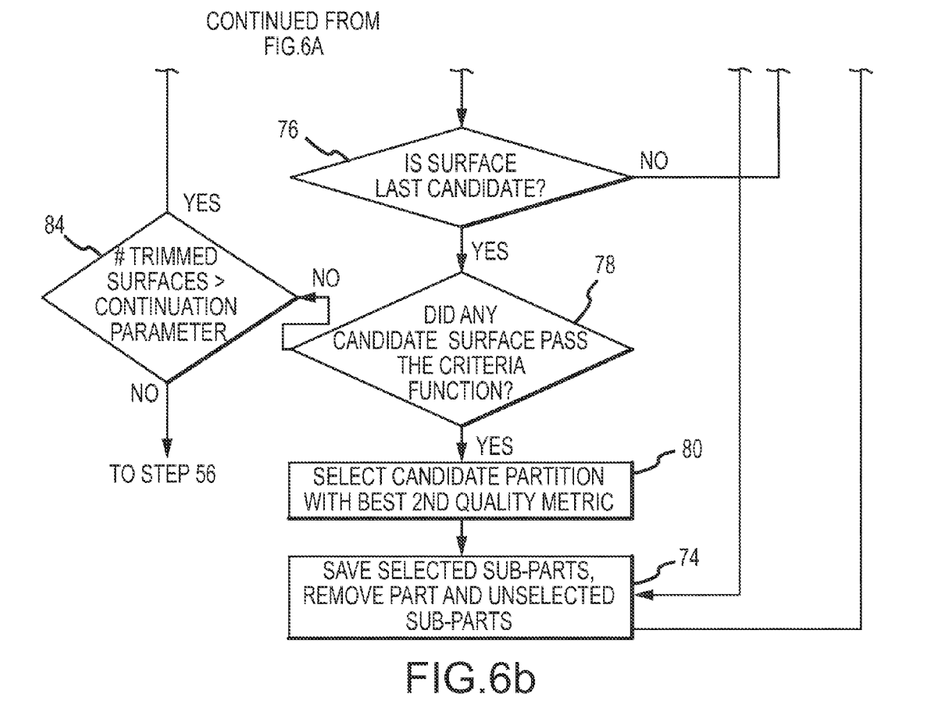

An exemplary embodiment of the partitioning process for a single part executed by the slicing tool and solid modeler incorporating both quality and complexity metrics is given in FIGS. 6a and 6b. The part geometry from the CAD model is loaded into the solid-modeler (step 50). In response to a surface query, the solid modeler provides a list of the existing bounding (and any ambiguity) surfaces for the part geometry (step 52). At the first iteration for the original part, the tool queries the solid-modeler to provide the number of trimmed surfaces for the part. In subsequent iterations or recursions, the tool saves the number of trimmed surfaces in the selected sub-parts, which become the number of surfaces in the part. The tool compares the number of trimmed surfaces to a halting parameter (a complexity parameter) (step 54). If the number of trimmed surfaces is less than the halting parameter, the tool deems the part to be simple enough. The tool determines whether any sub-parts remain for partitioning (step 56). If not, the tool terminates (step 58) and the solid-modeler writes out the surface lists for each of the simplified sub-parts, if yes, the tool returns to step 52 and the solid modeler provides the existing bounding surfaces for the next sub-part. Note, if the input file includes multiple parts, each one is treated, separately.

If the number of trimmed surfaces is not less than the halting parameter, the slicing tool picks one of the existing surfaces from the list and commands the solid modeler to partition the part along the candidate surface (step 60). The slicing tool then queries the solid modeler to provide the number of trimmed surfaces in each of the two or more sub-parts for the candidate partition (step 62). The tool computes a first quality metric for the partition based on the number of trimmed, surfaces in the part and the sub-parts (step 64). As discussed above, the metric is suitably a proxy for the factorial metric, one that weights the maximum number of surfaces in a sub-part and possibly the total number of surfaces. The number of trimmed surfaces squared and summed over the sub-parts and the ratio of the maximum number of trimmed surfaces in any one of the sub-parts to the number of trimmed surfaces in the part are two possible metrics.

Based on this $1^{st}$ quality metric, the tool determines whether the candidate partition passes a criteria function that sets a minimum level of simplification that, must be achieved (step 66). For example, using the sum of squares metric, the criteria function might specify that the sum of squares for the sub-parts must be less than "X" times the squared number of trimmed surfaces in the part where X is less than one. The smaller is X the more difficult the criteria function is to satisfy. A typical value might be 0.9. Using the ratio metric, the criteria function might specify that the ratio must be less than Y where Y is less than one. The smaller is Y the more difficult the criteria function is to satisfy. A typical value might be 0.8. If the partition does not satisfy the criteria function it is discarded and the tool selects the next candidate surface from the list (step 68).

If the partition, satisfies the minimum criteria function, the tool then determines whether the partition is good enough to terminate the search prematurely (i.e. prior to testing every surface). The process of selecting a best partition from all of the candidates can be very time consuming if the number of surfaces on the list is very large. The tool can either use the first quality metric or compute a second quality metric for the partition (step 70). For example, the tool may use the sum of squares to test the criteria function and may use the ratio function to select the best partition. The tool uses the first or second quality metric to determine whether the partition passes the search termination criteria (step 72). To justify early termination, the partition should be good. Accordingly the X or Y values used in the criteria function are lowered to require significant improvement over the current part. As a further refinement the X or Y values may follow a sliding scale according to the number of trimmed surfaces N in the current part. If the number is large, higher values are set to make it easier to terminate the search. For example, using the ratio metric if the number of surfaces N is greater than 500 Y is set at 0.7, greater than 200 Y is set at 0.6, and then 0.55. If the number of trimmed surfaces is small, the computer resources to search all candidate partitions is less significant and it's harder to find a good partition. If the candidate partition is good enough, the tool skips to step 74 and saves the selected sub-parts (or the slicing surface to generate them), discards the part and the unselected sub-parts and returns to step 56 to determine if there any further sub-parts to partition.

If the current partition is good enough to consider (passes the criteria function) but not good enough to terminate the search, the tool determines if the surface is the last candidate slicing surface on the list (step 76). If not, the tool selects the next candidate slicing surface from the list (step 68) and repeats the partitioning process. The tool may select surfaces from the list in order, randomly or in order of proximity to the center of the current part, the theory being that surfaces closer to the center are more likely to be good slicing surfaces. Assuming that none of the partitions are good enough to exit the search prematurely, when the tool reaches the last surface in step 76 it first checks to make sore that at least one candidate partition passed the criteria function (step 78) and, if yes, selects the candidate partition with the best second quality metric (step 80). Again the first and second quality metrics may be the same metric. Using the current metrics, the tool selects the partition with either the smallest sum of squares or smallest ratio, saves the sub-parts (or slicing surface), discards the part and unselected sub-parts and returns to step 56 to process another sub-part (step 74).

If none of the candidate partitions selected from the list of existing surfaces pass the criteria function in step 78, the tool has two options. First, the tool can accept that the current part cannot be effectively partitioned and return to step 56 to process the next sub-part or terminate. Second, the tool can generate another set of candidate slicing surfaces (step 82) and start over for the current part at step 60. If none of these slicing surfaces produce a partition that satisfies the criteria function the tool returns to step 56. The latter option may be invoked when the part is still fairly complex but for whatever reasons was not partitionable by the existing surfaces. For example, in step 84 the tool can compare the number of trimmed surfaces in the current part to a continuation parameter. If the number of surfaces does not exceed this parameter, the tool deems further partitioning to not have sufficient merit and returns to step 56 and the next sub-part, if the number of surfaces does exceed the parameter, the tool generates the additional set of surfaces in step 82. The continuation parameter is larger than the halting parameter. For example, the halting parameter might be set at 15 and the continuation parameter at 50. As shown in FIG. 5, a relatively simple and effective way to generate the additional set of surfaces is to translate the existing surfaces.

Figure 7:
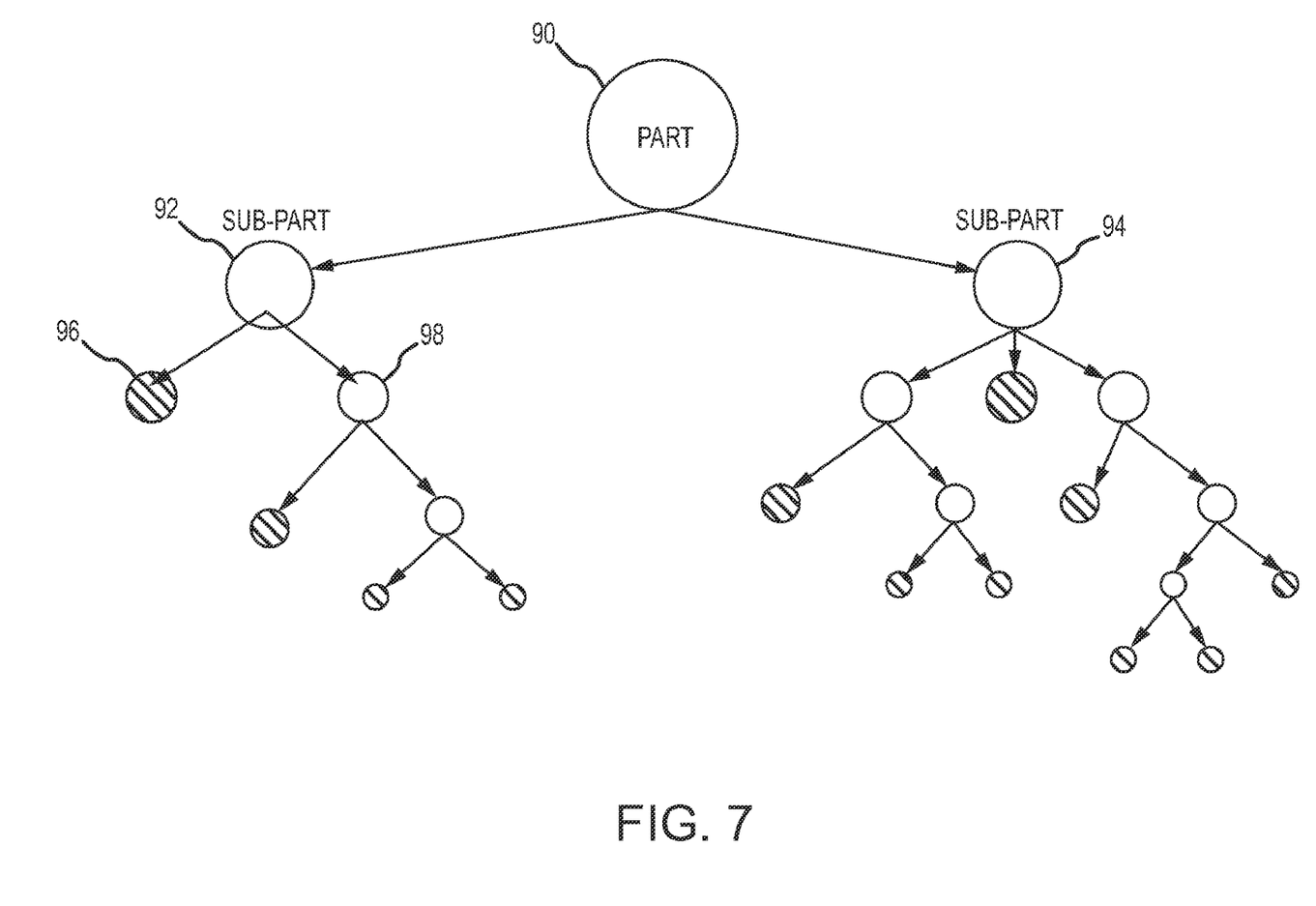
FIG. 7 is a diagram illustrating a recursive implementation of the partitioning process to generate the series of sub-solids the union of which is the original solid.

As described, the tool repeats the partitioning process on each sub-part until all of them have terminated in one form or another as shown in FIG. 7. The tool may repeat recursively or iteratively, the two are equivalent in result although recursion is typically simpler and more efficient to implement. For purposes of illustration only, the tool partitions an arbitrary part 90 into two sub-parts 92 and 94. Each of these sub-parts becomes the part at the next recursion or iteration. The tool partitions part 92 into sub-parts 96 and 98. The tool attempts to partition part 96 but is unsuccessful either part 96 has so few surfaces it satisfies the halting parameter or the tool could not find a partition that satisfies the search criteria. The tool continues to partition each sub-part as a part until each branch terminates as indicated by the hatched nodes. At this point, the tool exits and the solid modeler writes out the list of analytic bounding surfaces for each of the terminated sub-parts. As is evident from the tree structure in FIG. 7 the union of all of the terminated sub-parts is the same as part 90.

Figure 8:
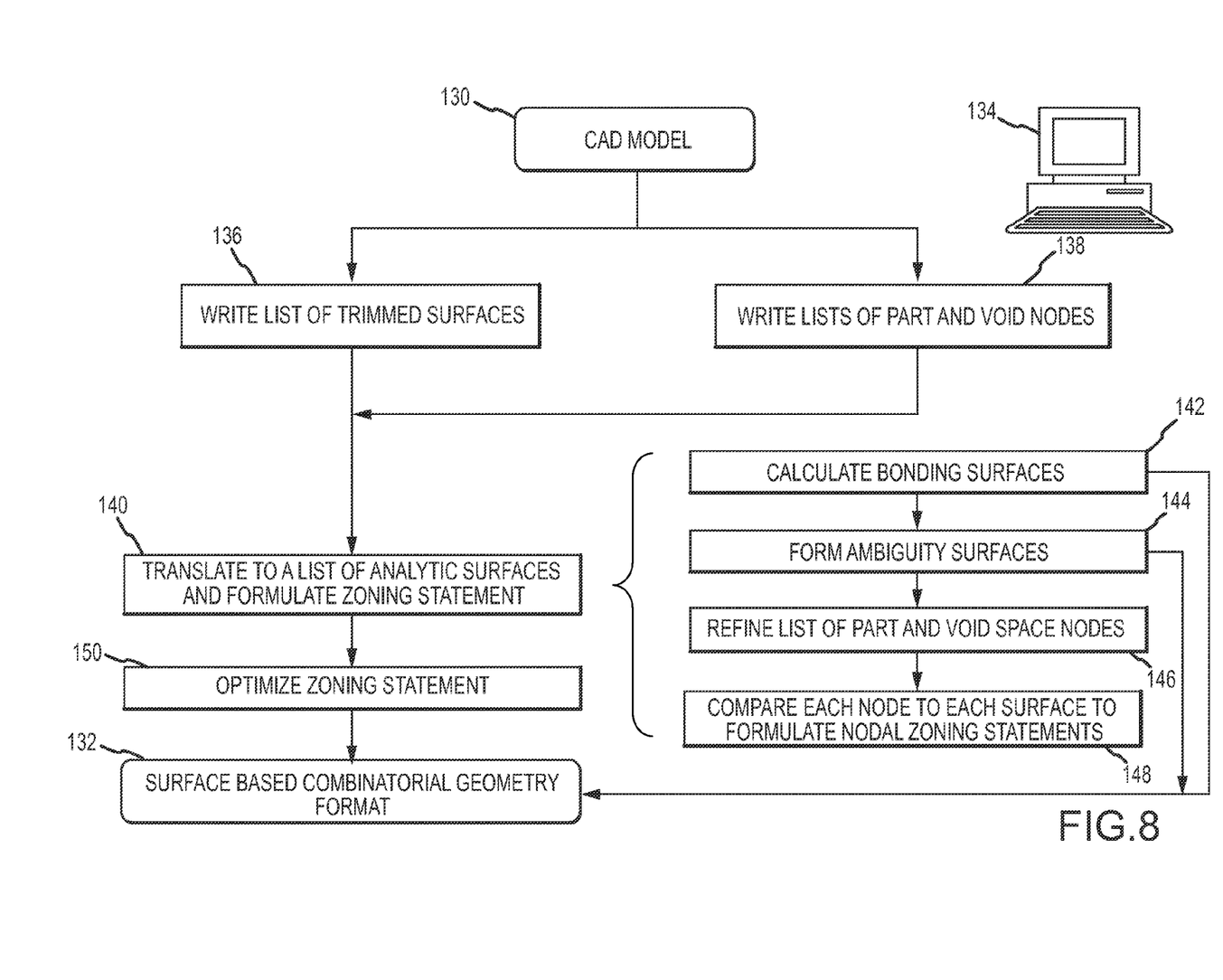
FIG. 8 is a flow diagram for translating the simplified IGES or STEP file into a surface based combinatorial geometry format.

Some applications for analyzing the geometry do not accept IGES or STEP but require the SBCG format. As shown in FIG. 8, the high order complex geometry for a part is translated from a CAD Model 130 into a SBCG format 132 using an automated process implemented on a computer 134, which improves speed, accuracy and consistency of the translation. The first step in developing the automated process was to realize that the data required for such an automated translation was readily supported by ail major CAD programs such as ProEngineer and finite element (FE) tools such as Pro Mechanics or ANSYS commonly used in conjunction with CAD programs. More specifically, the CAD programs write a list of trimmed surfaces (step 136) as a normal output of forming the three-dimensional CAD models. The list of trimmed surfaces being the list of analytic bounding surfaces that are trimmed by other analytic bounding surfaces, curves and points for each of the sub-parts generated, by the slicing tool and solid modeler. The CAD program, e.g. a FE tool, or a random node generation algorithm, writes a list of nodes for each sub-part and a list for any void spaces (step 138).

The second step was to develop the computer-implemented process for translating the list of trimmed surfaces into a list of analytic surfaces and then using those surfaces and nodal data derived from the candidate nodes to formulate a well-posed zoning statement (step 140). The automated translation and formulation is a four step process in which the computer calculates the analytic equations for bounding surfaces from the list of trimmed surfaces (step 142), forms any required ambiguity surfaces (step 144), refines the lists of part and void space nodes to eliminate any nodes that lie too close to boundary surfaces and to add nodes to ensure sufficient density (step 146) and compares each node to each of the analytic surfaces to form a nodal zoning statement for each unique region of space ("zone") (step 148). The list of nodal zoning statements forms the initial well-posed zoning statement. Once the computer has translated the CAD model into a SBCG format it is generally desirable, although not necessary, to optimize the zoning statement by merging zones and eliminating references to redundant surfaces to improve translation efficiency using, for example, a binary minimization algorithm (step 150).

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. A system, comprising:
a computer-implemented solid-modeling system, said computer representing a three-dimensional part as a list of analytic bounding surfaces that are trimmed by other analytic bounding surfaces, curves and points to define the geometric representation of the part, said computer providing the list of analytic surfaces as candidate slicing surfaces and being responsive to a command to partition a part along a slicing surface selected from said list by generating a partition including two or more sub-parts including their respective lists of analytic bounding surfaces from the list of analytic bounding surfaces for the part and returning the number of trimmed surfaces in each of the sub-parts; and
a computer-implemented slicing tool, said computer (a) commands the solid-modeling system computer to partition the part along a plurality of different candidate slicing surfaces selected from the list, (b) computes at least one quality metric that estimates the number of trimmed surfaces in each sub-part factorial summed over all of the sub-parts for each candidate partition based on the number of trimmed surfaces in the part and sub-parts, (c) selects one candidate partition with a small said at least one quality metric, and repeats steps a, b and c on one or more of the sub-parts and their respective lists of analytic bounding surfaces generated by the solid-modeling system computer to produce a series of simpler sub-parts the union of which is the part that reduce the quality metric until a termination condition is met.

2. The system of claim 1, further comprising:
a CAD system computer that generates a CAD model that provides the geometric representation of the three-dimensional part, said geometric representation loaded into said solid-modeling system.

3. The system of claim 1, further comprising:
a second computer-implemented solid modeling system; and
an application program computer that in conjunction with said second solid-modeling system computer performs combinatorial surface operations on the lists of analytic bounding surfaces for the series of simpler sub-parts to analyze and output physical characteristics of the part, said factorial metric representing a computational load for performing combinatorial surface operations on the sub-parts for the candidate partition.

4. The system of claim 3, wherein the output physical characteristics are selected from at least one of radiation, mechanical, optical, thermal, structural and biological.

5. The system of claim 3, further comprising:
a computer implemented translation program, said computer translating the lists of analytic bounding surfaces into another geometric format compatible with said application program computer.

6. The system of claim 1, wherein the slicing tool computer repeats on said sub-parts recursively until a termination condition is met.

7. The system of claim 1, wherein the list of analytic surfaces provided as candidate slicing surfaces includes non-planar analytic surfaces.

8. The system of claim 1, wherein the slicing tool computer searches the list of candidate slicing surfaces one at a time based on proximity of the candidate slicing surface to the center of the part.

9. The system of claim 1, wherein said at least one quality metric is a proxy that estimates a factorial metric that is the number of trimmed surfaces in each sub-part factorial summed over all of the sub-parts said factorial metric representing a computational load for performing combinatorial surface operations on the sub-parts for the candidate partition.

10. The system of claim 1, wherein said slicing tool computer tests a first said quality metric against a criteria function to determine whether the candidate partition satisfies a minimum simplification requirement, if not said slicing tool computer discards the candidate partition.

11. The system of claim 10, wherein if none of the candidate partitions pass the criteria function, said slicing tool computer generates another list of candidate slicing surfaces and repeats the process of partitioning the part.

12. The system of claim 11, wherein the slicing tool computer generates said another list of candidate slicing surfaces by translating the existing surfaces.

13. The system of claim 11, wherein said slicing tool computer generates said another list if the number of trimmed surfaces in the part being partitioned exceeds a threshold, otherwise partition of that part terminates.

14. The system of claim 10, wherein if the candidate partition passes the criteria function, said slicing tool computer tests a second said quality metric to determine whether the candidate partition passes a search termination criteria to select the candidate partition without considering the remaining candidate slicing surfaces.

15. The system of claim 14, wherein the search termination criteria becomes harder to satisfy as the number of trimmed surfaces in the part being partitioned is reduced.

16. The system of claim 14, wherein said first and second said quality metrics are different metrics that are each a proxy that estimates a factorial metric, said factorial metric representing a computational load for performing combinatorial surface operations on the sub-parts for the candidate partition.

17. The system of claim 16, wherein said first quality metric is the sum of the squares of the number of trimmed surfaces in the sub-parts and the second quality metric is the ratio of the maximum number of trimmed surfaces in one said sub-part to the number of trimmed surfaces in the part being partitioned.

18. The system of claim 10, wherein said slicing tool computer first tests the part or sub-part being partitioned to determine if the number of trimmed surfaces exceeds a threshold, if not said slicing tool computer terminates the partition of that part or sub-part.

19. A system, comprising:
  a CAD system computer that generates a CAD model that provides a geometric representation of a three-dimensional part;
  a first computer-implemented solid-modeling system, said system loading the geometric representation and providing a list of analytic bounding surfaces that are trimmed by other analytic bounding surfaces, curves and points for the part, said computer providing the list of analytic surfaces as candidate slicing surfaces and being responsive to a command to partition a part along a slicing surface selected from said list by generating a partition including two or more sub-parts including their respective lists of analytic bounding surfaces from the list of analytic bounding surfaces for the part and returning the number of trimmed surfaces in each of the sub-parts;
  a computer-implemented slicing tool, said computer (a) commands the first solid-modeling system computer to partition the part along a plurality of different candidate slicing surfaces selected from the list, (b) computes at least one quality metric that estimates the number of trimmed surfaces in each sub-part factorial summed over all of the sub-parts for each candidate partition based on the number of trimmed surfaces in the part and sub-parts, (c) selects one candidate partition with a small said at least one quality metric, and repeats steps a, b and c on one or more of the sub-parts and their respective lists of analytic bounding surfaces generated by the first solid-modeling system computer to produce a series of simpler sub-parts the union of which is the part that reduce the quality metric until a termination condition is met;
  a second computer-implemented solid modeling system; and
  a computer-implemented application that in conjunction with said second solid-modeling system performs combinatorial surface operations on the lists of analytic bounding surfaces for the series of simpler sub-parts to analyze and output physical characteristics of the part selected from at least one of radiation, mechanical, optical, thermal, structural and biological, wherein said quality metric represents the computational load for performing the combinatorial surface operations on the sub-parts.

20. The system of claim 19, wherein said at least one quality metric is a proxy that estimates a factorial metric that is the number of trimmed surfaces in each sub-part factorial summed over all of the sub-parts, said factorial metric representing a computational load for performing the combinatorial surface operations on the sub-parts for the candidate partition.

21. A computer-implemented method of subdividing a three-dimensional part into a series of simpler sub-parts the union of which is the part, said part represented by a list analytic bounding surfaces that are trimmed by other analytic bounding surfaces, curves and points that define a geometric representation of the part, comprising:
  a) providing the list of analytic bounding surfaces that define the existing part as candidate slicing surfaces;
  b) using a computer-implemented solid modeling system to partition the part along a plurality of candidate slicing surfaces selected from said list to provide the number of trimmed surfaces in each of two or more sub-parts for each candidate partition;
  c) computing a first quality metric as a proxy of a factorial metric that is the number of trimmed surfaces in each sub-part factorial summed over all of the sub-parts for each candidate partition based on the number of trimmed surfaces in the part and sub-parts;
  d) selecting one candidate partition with a small said first quality metric;
  e) providing a list of analytic bounding surfaces for each said sub-part from the list of analytic boundary surfaces for the part for the selected partition and repeating steps b through d on each said sub-part to reduce the quality metric until a termination condition is met, and
  f) outputting the lists of planar and non-planar analytic bounding surfaces for the final series of sub-parts the union of which is the part.

22. A computer-implemented method of subdividing a three-dimensional part into a series of simpler sub-parts the union of which is the part, said part represented by a list analytic bounding surfaces that are trimmed by other analytic bounding surfaces, curves and points that define a geometric representation of the part, comprising:
  a) providing the list of analytic bounding surfaces that define the existing part as candidate slicing surfaces;
  b) using a computer-implemented solid modeling system to partition the part along a plurality of candidate slicing surfaces selected from said list to provide the number of trimmed surfaces in each of two or more sub-parts for each candidate partition;
c) computing a first quality metric as a proxy of a factorial metric that is the number of trimmed surfaces in each sub-part factorial summed over all of the sub-parts for each candidate partition based on the number of trimmed surfaces in the part and sub-parts;
d) selecting one candidate partition with a small said first quality metric;
e) providing a list of analytic bounding surfaces for each said sub-part from the list of analytic boundary surfaces for the part for the selected partition and repeating steps b through d on each said sub-part to reduce the quality metric until a termination condition is met;
f) outputting the lists of planar and non-planar analytic bounding surfaces for the final series of sub-parts the union of which is the part;
g) translating the lists of analytic bounding surfaces into a surface based combinatorial geometry (SBCG) format; and
h) performing combinatorial surface operations on the lists of analytic bounding surfaces in the SBCG for the series of simpler sub-parts using ray-tracing to compute how many radiation particles pass through the surface of the part and how many radiation particles are absorbed or cause secondary emissions of radiation within the part, said computation load of the combinatorial surface operations on the sub-parts represented by the factorial of the number of analytic bounding surfaces in the series of simpler sub-parts.

23. The method of claim 21, wherein selecting the candidate partition with the smallest metric further comprises:
testing a first said quality metric against a criteria function to determine whether the candidate partition satisfies a minimum simplification requirement, if not said tool discards the candidate partition, and
if the candidate partition passes the criteria function, testing a second said quality metric to determine whether the candidate partition passes a search termination criteria to select the candidate partition without considering the remaining candidate slicing surfaces.

24. The system of claim 19, wherein said slicing tool tests a first said quality metric against a criteria function to determine whether the candidate partition satisfies a minimum simplification requirement, if not said tool discards the candidate partition, and if the candidate partition passes the criteria function, said tool tests a second said quality metric to determine whether the candidate partition passes a search termination criteria to select the candidate partition without considering the remaining candidate slicing surface.

25. The system of claim 20, wherein said quality metric is either the sum of the squares of the number of trimmed surfaces in the sub-parts or the ratio of the maximum number of trimmed surfaces in one said sub-part to the number of trimmed surfaces in the part being partitioned.

26. A system, comprising:
a CAD system that generates a CAD model that provides a geometric representation of a three-dimensional part;
a first computer-implemented solid-modeling system, said system loading the geometric representation and providing a list of analytic bounding surfaces that are trimmed by other analytic bounding surfaces, curves and points for the part, said computer providing the list of analytic surfaces as candidate slicing surfaces and being responsive to a command to partition a part along a slicing surface selected from said list by generating a partition including two or more sub-parts-including their respective lists of analytic bounding surfaces from the list of analytic bounding surfaces for the part and returning the number of trimmed surfaces in each of the sub-parts;
a computer-implemented slicing tool, said computer (a) commands the solid-modeling system to partition the part along a plurality of different candidate slicing surfaces selected from the list, (b) computes at least one quality metric that estimates the number of trimmed surfaces in each sub-part factorial summed over all of the sub-parts for each candidate partition based on the number of trimmed surfaces in the part and sub-parts, (c) selects one candidate partition with a small said at least one quality metric, and repeats steps a, b and c on one or more of the sub-parts and their respective lists of analytic bounding surfaces generated by the first solid-modeling system computer to produce a series of simpler sub-parts the union of which is the part that reduce the quality metric until a termination condition is met;
a computer-implemented translation program, said computer translating the lists of analytic bounding surfaces into a surface based combinatorial geometry (SBCG) format;
a second computer-implemented solid modeling system; and
a computer-implemented ray-tracing radiation transport application that models the effect of radiation impinging on the part, said ray-tracing radiation transport application computer in conjunction with said second solid-modeling system computer performs combinatorial surface operations on the lists of analytic bounding surfaces in the SBCG format for the series of simpler sub-parts to compute how many radiation particles pass through the surface of the part and how many radiation particles are absorbed or cause secondary emissions of radiation within the part, wherein said quality metric represents the computational load for performing the combinatorial surface operations on the sub-parts.

27. The system of claim 26, wherein said at least one quality metric is a proxy that estimates a factorial metric that is the number of trimmed surfaces in each sub-part factorial summed over all of the sub-parts, said factorial metric representing a computational load for performing the combinatorial surface operations on the sub-parts for the candidate partition.

28. The system of claim 27, wherein the slicing tool computer selects the one candidate partition with the smallest said at least one quality metric.

* * * * *